(12) United States Patent
Chang et al.

(10) Patent No.: US 8,929,109 B2
(45) Date of Patent: Jan. 6, 2015

(54) DOUBLE-OUTPUT HALF-BRIDGE LLC SERIAL RESONANT CONVERTER

(71) Applicant: Chung-Shan Institute of Science and Technology, Taoyuan (TW)

(72) Inventors: Zen-Shan Chang, Taoyuan (TW);
Ying-Sun Huang, Taoyuan (TW);
Kuo-Sheng Fu, Taoyuan (TW);
Kuo-Kuang Jen, Taoyuan (TW);
Chien-Min Kao, Taoyuan (TW)

( * ) Notice: Subject to any disclaimer, the term of this patent is extended or adjusted under 35 U.S.C. 154(b) by 217 days.

(21) Appl. No.: 13/689,757

(22) Filed: Nov. 30, 2012

(65) Prior Publication Data

US 2014/0153293 A1 Jun. 5, 2014

(51) Int. Cl.
*H02M 7/48* (2006.01)
*H02M 3/337* (2006.01)

(52) U.S. Cl.
CPC .......... *H02M 3/3376* (2013.01); *H02M 3/3378* (2013.01); *H02M 2007/4815* (2013.01)
USPC ................................ 363/71; 363/17; 323/267

(58) Field of Classification Search
USPC ............. 363/16–20, 21.02, 21.03, 49, 65, 69, 363/71, 127; 323/222, 225, 259, 267, 282, 323/285, 288
See application file for complete search history.

(56) References Cited

U.S. PATENT DOCUMENTS

| | | | | |
|---|---|---|---|---|
| 5,610,804 | A * | 3/1997 | Shimizu ..................... | 363/21.16 |
| 5,946,206 | A * | 8/1999 | Shimizu et al. ................. | 363/65 |
| 7,696,733 | B2 * | 4/2010 | Osaka ........................... | 323/267 |
| 8,274,799 | B2 * | 9/2012 | Reinberger et al. ............ | 363/13 |
| 8,717,784 | B2 * | 5/2014 | Park et al. .................. | 363/21.02 |

* cited by examiner

*Primary Examiner* — Rajnikant Patel (57) ABSTRACT

The present invention relates to a double-output half-bridge LLC serial resonant converter, comprising: a half-bridge rectifying unit, a first resonant unit, a first transformer unit, a first rectifying unit, a first output unit, a second resonant unit, a second transformer unit, a second rectifying unit, a second output unit, a voltage dividing unit, a voltage regulating unit, a light-coupling isolation unit, and a control unit. In the present invention, the double-output half-bridge LLC serial resonant converter has an inventive circuit framework, which can not only solve the unbalance load current and the output voltage cross regulation occurred in the conventional double-output convertor, but also normally modulate the no-load or light-load output voltage; therefore the output voltage deviation can be effectively controlled.

13 Claims, 8 Drawing Sheets

DOUBLE-OUTPUT HALF-BRIDGE LLC SERIAL RESONANT CONVERTER

BACKGROUND OF THE INVENTION

1. Field of the Invention

The present invention relates to an LLC serial resonant converter applied in a switch power supply, and more particularly to a double-output half-bridge LLC serial resonant converter.

2. Description of the Prior Art

Figure 1:
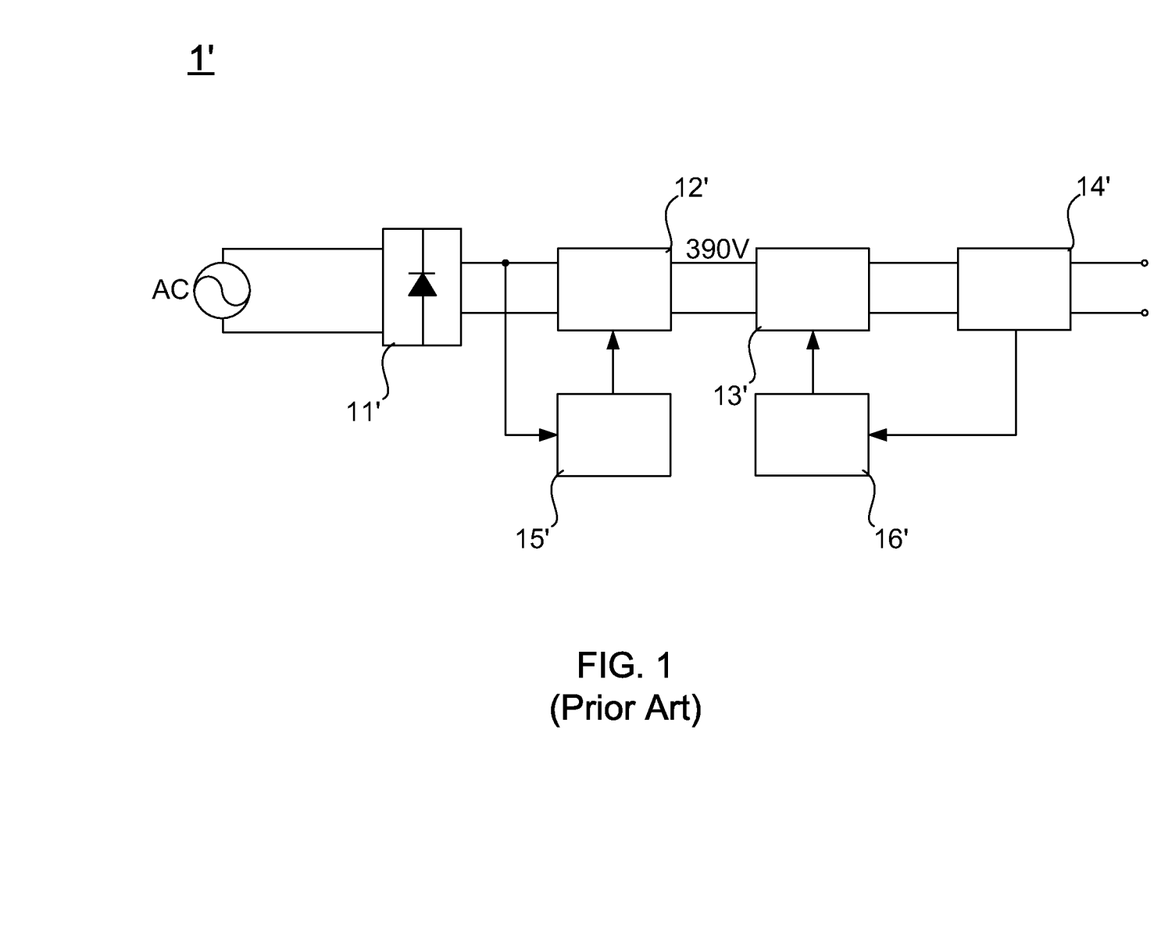
FIG. 1 is a framework diagram of a conventional switch power supply.

Recently, switch power supplies are well-developed and well-used, and most of the switch power supplies are two-stage circuit framework. Please refer to FIG. 1, which illustrates a framework diagram of a conventional switch power supply. As shown in FIG. 1, the conventional switch power supply 1' consists of a rectifying unit 11', a power factor correction unit 12', a DC/DC converting unit 13', an output unit 14', a PFC controlling unit 15', and a convertor controlling unit 16'. The power factor correction unit 12' is primary stage circuit, which is usually a boost converter and used for making the input current and the input voltage in phase, so as to make the power factor approach to 1. The DC/DC converting unit 13' is secondary stage circuit and used for transforming the 390V voltage to the necessary voltage of the output unit 14' (i.e., load end).

In the early days, the hard switching technology used in the power supply tends to cause switching losses when power switched is switched; moreover, the switching loss would increase with the increase of the switch frequency, and that brings the problems of low conversion efficiency, hard to do heat dissipation and inducing electromagnetic interference to the converting circuit. Accordingly, soft switching technology is developed and proposed for solving the problems induced by hard switching technology. To carry out the soft switching, at least one resonant inductor and at least one resonant capacitor is added into the converting circuit for constituting a resonator; Therefore, when the power switch is switched, the voltage signal crossed on the two terminals of the power switch is transformed to a sine wave voltage or a sine wave current by the resonator, so as to complete a zero voltage switching or a zero current switching. So that, the soft switch technology can not only solve the switching loss but also be helpful to the miniaturization of the converting circuit.

Currently, resonators are mainly divided into series resonant converter (SRC), parallel resonant converter (PRC), series-parallel resonant converter (SPRC) and LLC series resonant converter (LLC SRC), wherein the LLC SRC is proposed by C. Q. Lee and R. Liu in 1988.

Although there has a variety of resonant converters for applying in the switch power supplies; however, the current switch power supplies still have the shortcomings and drawbacks as follows:
1. There exists unbalance load current in the conventional switch power supply, and the unbalance load current would cause output voltage cross regulation in the output end of the switch power supply.
2. Inheriting to above point 1, although the hard switching technology and post regulator are used in the conventional switch power supply for enhancing the output load regulation, the load regulation in such switch power supply is still insufficient.
3. In addition, although LLC SRC performs higher low-frequency gain and provides wider input voltage range; however, the no-load or light-load output voltage still cannot be normally modulated whatever in LLC SRC or SRC, and that results in large voltage deviation.

Thus, in view of the conventional switch power supply and the resonators thereof still have shortcomings and drawbacks, the inventor of the present application has made great efforts to make inventive research thereon and eventually provided a double-output half-bridge LLC serial resonant converter.

SUMMARY OF THE INVENTION

The first objective of the present invention is to provide a double-output half-bridge LLC serial resonant converter, wherein the double-output half-bridge LLC serial resonant converter has an inventive circuit framework, which can not only solve the unbalance load current and the output voltage cross regulation occurred in the conventional double-output convertor, but also normally modulate the no-load or light-load output voltage; therefore the output voltage deviation can be effectively controlled.

Accordingly, to achieve the primary objective of the present invention, the inventor of the present invention provides a double-output half-bridge LLC serial resonant converter, comprising:

a half-bridge rectifying unit, comprising a first MOSFET and a second MOSFET, and coupled to an input voltage signal for processing a full cycle rectification to the input voltage signal;

a first resonant unit, comprising a first resonant inductor and a first resonant capacitor, and being coupled to the half-bridge rectifying unit for receiving the full-cycle rectified input voltage signal;

a first transformer unit, coupled to the half-bridge rectifying unit, wherein the input voltage signal is transmitted to the secondary side coil from the primary side coil of the first transformer unit, so as to be transformed to a secondary side voltage signal;

a first rectifying unit, coupled to the first transformer unit for further rectifying the secondary side voltage signal;

a first output unit, coupled to the first rectifying unit and having a first load resistor, wherein the first resonant inductor, the first resonant capacitor and the first load resistor constitute a serial resonant circuit, and the serial resonant circuit makes the secondary side voltage signal be losslessly transmitted to the first load resistor, so as to be outputted;

a second resonant unit, comprising a second resonant inductor and a second resonant capacitor, and coupled to the half-bridge rectifying unit for receiving the full-cycle rectified input voltage signal;

a second transformer unit, coupled to the half-bridge rectifying unit, wherein the input voltage signal is transmitted to the secondary side coil from the primary side coil of the second transformer unit, so as to be transformed to the secondary side voltage signal;

a second rectifying unit, coupled to the second transformer unit for further rectifying the secondary side voltage signal;

a second output unit, coupled to the second rectifying unit and having a second load resistor, wherein the second resonant inductor, the second resonant capacitor and the second load resistor constitute a serial resonant circuit, and the serial resonant circuit makes the secondary side voltage signal be losslessly transmitted to the second load resistor, so as to be outputted;

a voltage dividing unit, coupled to the first output unit and the second output unit, used for processing a voltage division to a first output voltage of the first output unit and a second output voltage of the second output unit;

a voltage regulating unit, comprising at least one operational amplifier and coupled to the voltage dividing unit for regulating and modulating the first output voltage and the second output voltage;

a light-coupling isolation unit, coupled to the voltage regulating unit; and a control unit, coupled to the light-coupling isolation unit, wherein the control unit is used for controlling the switch of the first MOSFET and the second MOSFET, moreover, the light-coupling isolation unit isolating the control unit from the first output voltage and the second output voltage.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a double-output half-bridge LLC serial resonant converter according to the present invention, embodiments of the present invention will be described in detail with reference to the attached drawings hereinafter.

Figure 2:
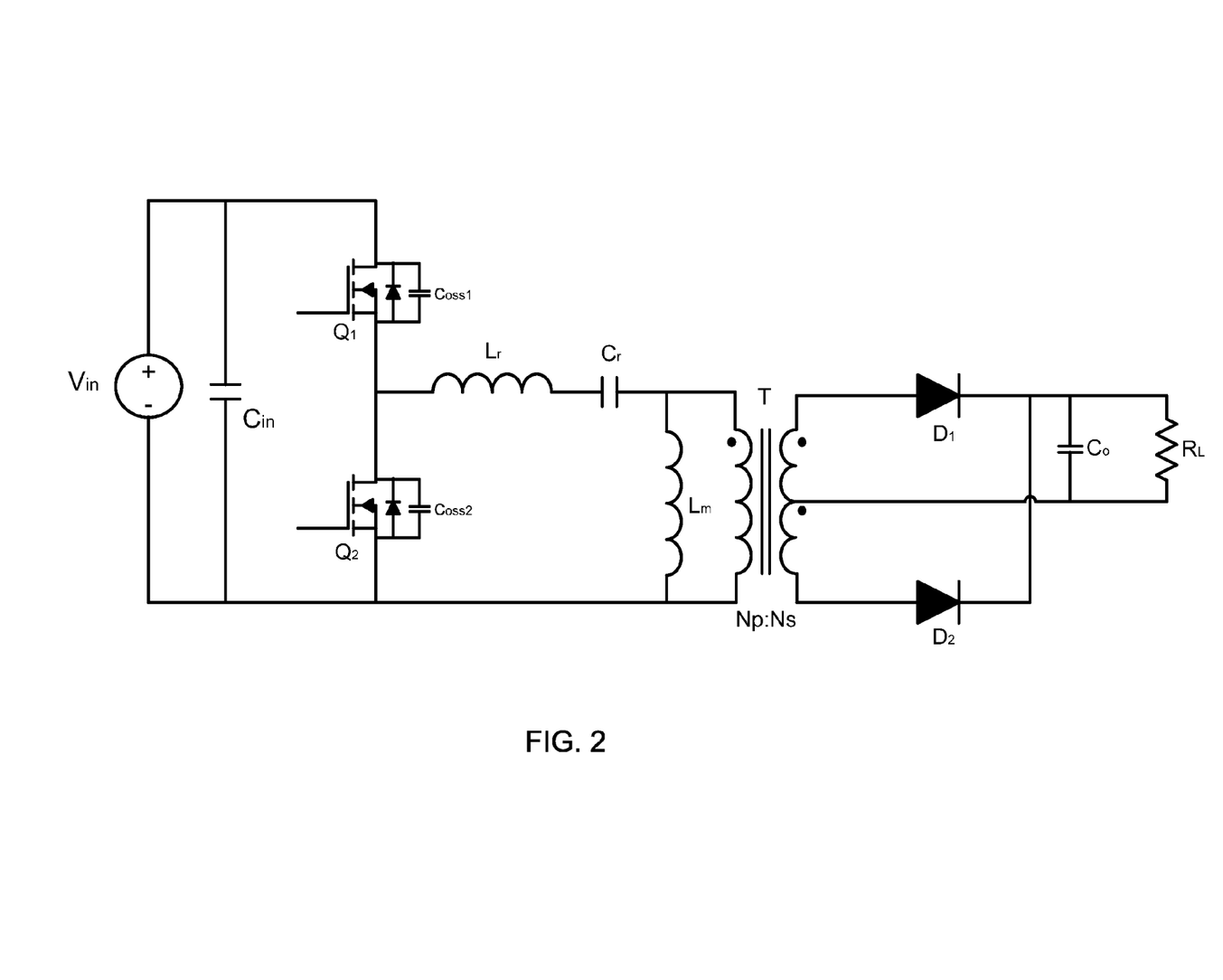
FIG. 2 is a circuit diagram of a half-bridge LLC serial resonant converter.

Before describing the double-output half-bridge LLC serial resonant converter of the present invention, a half-bridge LLC serial resonant converter will be firstly introduced in follows. Please refer to FIG. 2, which illustrates a circuit diagram of the half-bridge LLC serial resonant converter. As shown in FIG. 2, the half-bridge LLC serial resonant converter consists of a first transistor $Q_1$, a second transistor $Q_2$, an input capacitor $C_{in}$, a resonant inductor $L_r$, a resonant capacitor $C_r$, a transformer T, a first diode $D_1$, a second diode $D_2$, an output capacitor $C_o$, and a load resistor $R_L$, wherein the transformer T includes a magnetizing inductance $L_m$.

Figure 3:
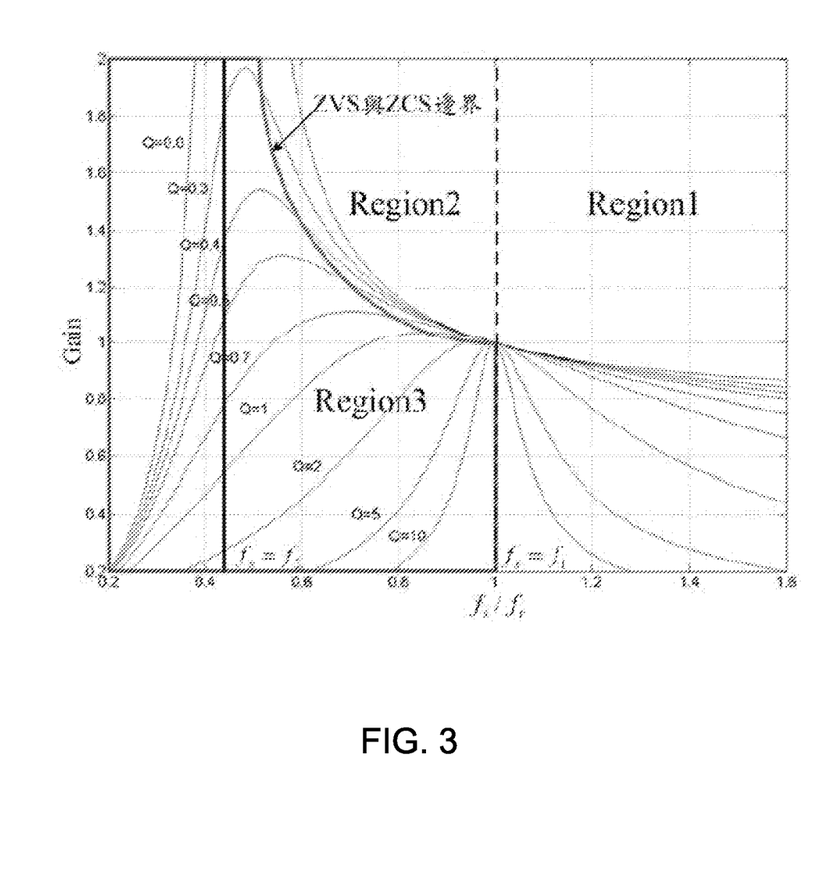
FIG. 3 is a frequency response plot of the half-bridge LLC serial resonant converter.

Please refer to FIG. 3, there is shown a frequency response plot of the half-bridge LLC serial resonant converter. As shown in FIG. 3, three regions are divided by a first resonant frequency $f_1$ and a second resonant frequency $f_1$, in which, when the switch frequency $f_s$ is greater than the first resonant frequency $f_1$, the circuit is operated in zero voltage switch (ZVS) region (region 1) and the output voltage gain is smaller than 1; in addition, when the switch frequency $f_s$ is between the first resonant frequency $f_1$ and the second resonant frequency $f_2$, the circuit is operated in zero voltage switch (ZVS) region (region 2) and the output voltage gain is greater than 1; moreover, when the switch frequency $f_s$ is smaller than the second resonant frequency $f_2$, the circuit is operated in zero current switch (ZCS) region (region 3).

Figure 4:
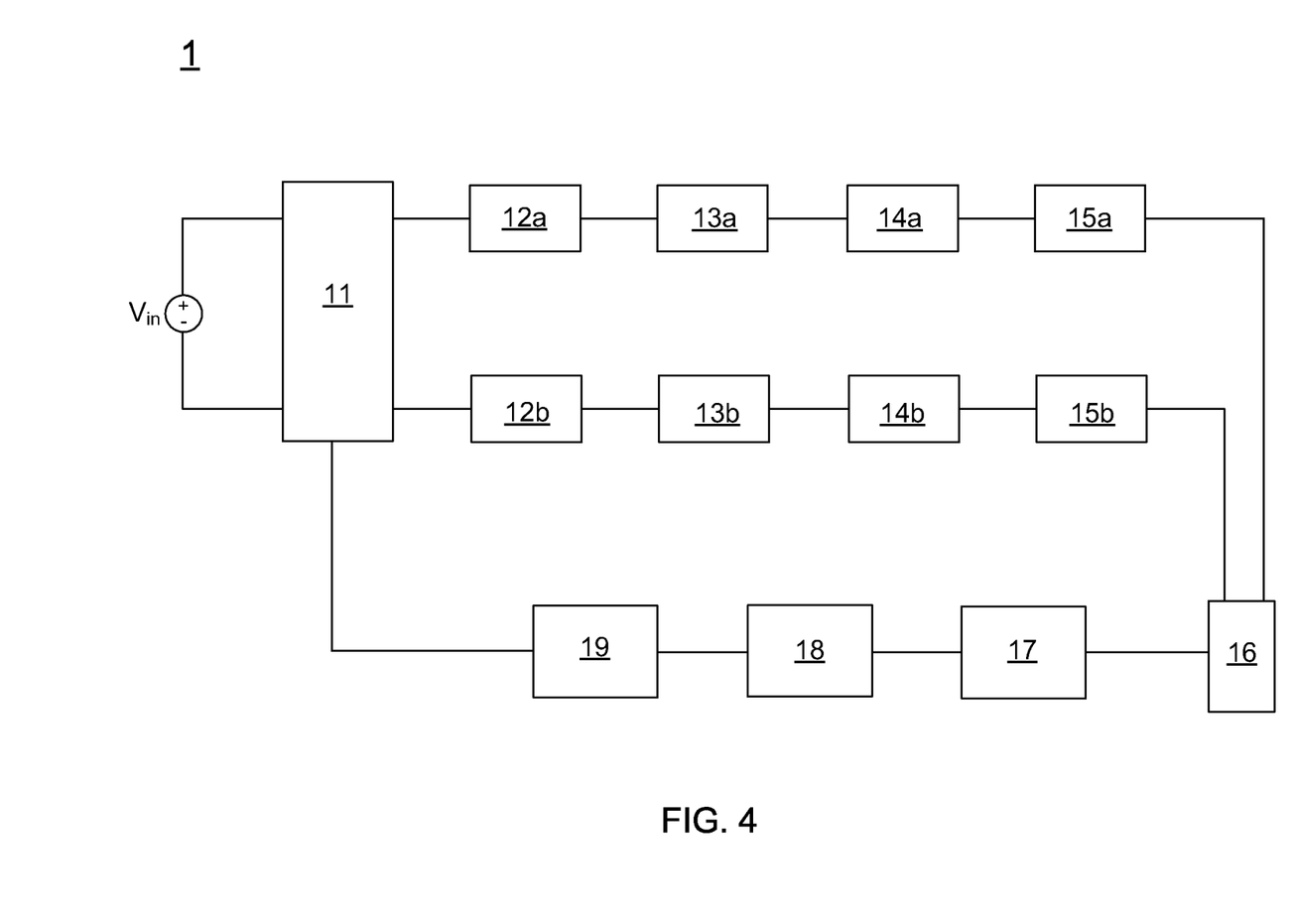
FIG. 4 is a framework diagram of a double-output half-bridge LLC serial resonant converter according to the present invention.
Figure 5:
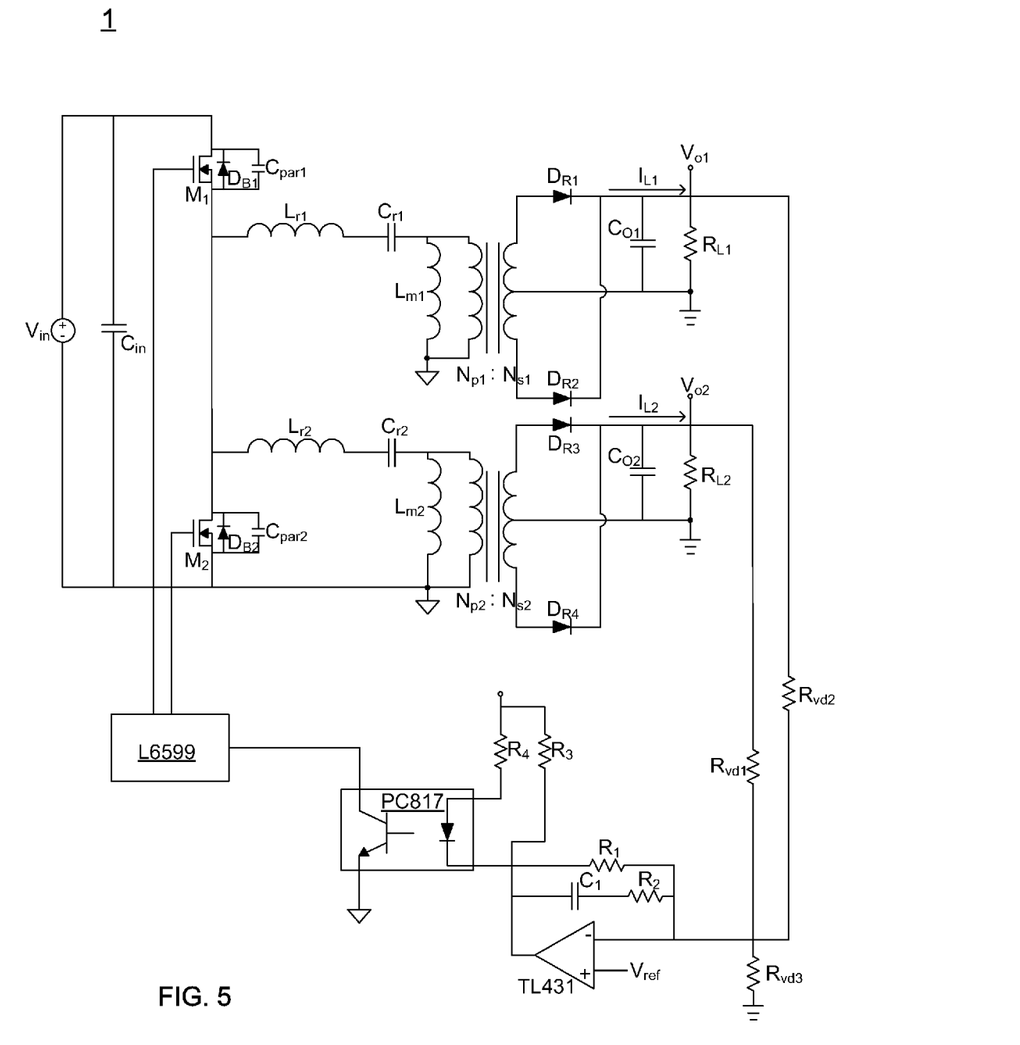
FIG. 5 is a circuit diagram of the double-output half-bridge LLC serial resonant converter according to the present invention.

The double-output half-bridge LLC serial resonant converter of the present invention is developed based on the aforesaid half-bridge LLC serial resonant converter. Please refer to FIG. 4 and FIG. 5, which respectively illustrate a framework diagram and a circuit diagram of the double-output half-bridge LLC serial resonant converter according to the present invention. As shown in FIG. 4 and FIG. 5, the double-output half-bridge LLC serial resonant converter 1 consists of a half-bridge rectifying unit 11, a first resonant unit 12a, a first transformer unit 13a, a first rectifying unit 14a, a first output unit 15a, a second resonant unit 12b, a second transformer unit 13b, a second rectifying unit 14b, a second output unit 15b, a voltage dividing unit 16, a voltage regulating unit 17, a light-coupling isolation unit 18, and a control unit 19.

In the circuit of the double-output half-bridge LLC serial resonant converter 1, the half-bridge rectifying unit 11 consists of a first MOSFET $M_1$ and a second MOSFET $M_2$, which is coupled to an input voltage signal for processing a full cycle rectification to the input voltage signal. In addition, an input capacitor $C_{in}$ is coupled to the input voltage signal and the half-bridge rectifying unit 11 for filtering the noise signal carried on the input voltage signal. As shown in FIG. 5, the first MOSFET $M_1$ and the second MOSFET $M_1$ respectively have a first body diode $DB_1$ and a second body diode $DB_1$ in the interior thereof; moreover, the first MOSFET $M_1$, and the second MOSFET $M_2$ also respectively have a first parasitic capacitor $C_{par1}$ and a second parasitic capacitor $C_{par2}$ in the interior thereof.

The a first resonant unit 12a includes a first resonant inductor $L_{r1}$ and a first resonant capacitor $C_{r1}$, and is coupled to the half-bridge rectifying unit 11 for receiving the full-cycle rectified input voltage signal. The first transformer unit 13a is coupled to the half-bridge rectifying unit 11, and the turn ratio between the primary side coil and the secondary side coil of the first transformer unit 13a is $N_{p1}:N_{s1}$; therefore, in this double-output half-bridge LLC serial resonant converter 1, the full-cycle rectified input voltage signal is transmitted to the secondary side coil from the primary side coil of the first transformer unit 13a for being transformed to a secondary side voltage signal. Moreover, the first rectifying unit 14a is coupled to the first transformer unit 13a for further rectifying the secondary side voltage signal; wherein the first rectifying unit 14a consists of a first rectifying diode $D_{R1}$ and a second rectifying diode $D_{R2}$, and the first rectifying diode $D_{R1}$ is parallel connected to the second rectifying diode $D_{R2}$.

The first output unit 15a is coupled to the first rectifying unit 14a and includes a first load resistor $R_{L1}$ and a first output capacitor $C_{o1}$, as shown in FIGS., the first output capacitor $C_{o1}$ is parallel connected to first the load resistor $R_{L1}$ for filtering the non-DC signal on the secondary side voltage signal. In the present invention, the first resonant inductor $L_{r1}$, the first resonant capacitor $C_{r1}$ and the first load resistor $R_{L1}$ constitute a serial resonant circuit, and the serial resonant circuit makes the secondary side voltage signal be losslessly transmitted to the first load resistor $R_{L1}$, so as to be outputted.

The second resonant unit 12b consists of a second resonant inductor $L_{r2}$ and a second resonant capacitor $C_{r2}$, and is coupled to the half-bridge rectifying unit 11 for receiving the full-cycle rectified input voltage signal. The second transformer unit 13b is coupled to the half-bridge rectifying unit 11, and the turn ratio between the primary side coil and the secondary side coil of the second transformer unit 13b is $N_{p2}:N_{s2}$; therefore, in this double-output half-bridge LLC serial resonant converter 1, the full-cycle rectified input voltage signal is transmitted to the secondary side coil from the primary side coil of the second transformer unit 13b for being transformed to a secondary side voltage signal. Moreover, the second rectifying unit 14b is coupled to the second transformer unit 13b for further rectifying the secondary side voltage signal; wherein the second rectifying unit 14b consists of a third rectifying diode $D_{R3}$ and a fourth rectifying diode $D_{R4}$, and the third rectifying diode $D_{R3}$ is parallel connected to the fourth rectifying diode $D_{R4}$.

The second output unit 15b is coupled to the second rectifying unit 14b and includes a second load resistor $R_{L2}$ and a second output capacitor $C_{O2}$, as shown in FIGS., the second output capacitor $C_{o2}$ is parallel connected to second the load resistor $R_{L2}$ for filtering the non-DC signal on the secondary side voltage signal. In the present invention, the second resonant inductor $L_{r2}$, the second resonant capacitor $C_{r2}$ and the second load resistor $R_{L2}$ constitute a serial resonant circuit, and the serial resonant circuit makes the secondary side voltage signal be losslessly transmitted to the second load resistor $R_{L2}$, so as to be outputted.

Continuously, the voltage dividing unit 16 is coupled to the first output unit 15a and the second output unit 15b, used for processing a voltage division to a first output voltage of the first output unit 15a and a second output voltage 15b of the second output unit. As shown in FIG. 5, the voltage dividing unit 16 consists of a first voltage dividing resistor $R_{vd1}$, a second voltage dividing resistor $R_{vd2}$ and a third voltage dividing resistor $R_{vd3}$. The voltage regulating unit 17 is coupled to the voltage dividing unit 16 and consists of an operational amplifier TL431, a first resistor $R_1$, a second resistor $R_2$, and a first capacitor $C_1$, in which the second resistor $R_2$ is series connected to the first capacitor $C_1$ and the second resistor $R_2$ is parallel connected to the first resistor $R_1$; moreover, the first resistor $R_1$, the second resistor $R_1$ and the first capacitor $C_1$ are coupled to the operational amplifier TL431 for providing a low-frequency gain, a mid-frequency gain, and a high-frequency gain to the operational amplifier TL431, such that the voltage regulating unit 17 is able to regulate and modulate the first output voltage and the second output voltage.

The light-coupling isolation unit 18 is coupled to the voltage regulating unit 17 and consists of a light coupler PC817, a third resistor $R_3$ and a fourth resistor $R_4$. The control unit 19 is a high-voltage resonant controller and coupled to the light-coupling isolation unit 18, wherein the control unit 19 is used for controlling the switch of the first MOSFET $M_1$ and the second MOSFET $M_2$, moreover, the light-coupling isolation unit 18 isolates the control unit 19 from the first output voltage and the second output voltage.

Thus, through the descriptions, the circuit framework and components of double-output half-bridge LLC serial resonant converter have been completely introduced and disclosed. Next, for improving the practicability and the performance of this double-output half-bridge LLC serial resonant converter, the experiment data are presented in following table (1) and table (2):

TABLE (1)

| | |
|---|---|
| Range of input voltage | $V_{in}$ = 380 V~400 V |
| Range of 15 V output voltage | $V_{O1}$ = 11.4 V~12.6 V |
| Range of 5 V output voltage | $V_{O2}$ = 4.75 V~5.25 V |
| Switch frequency | $f_s$ = 40 kHz~200 kHz |

TABLE (1)-continued

| | |
|---|---|
| Range of 12 V load current | $I_{L1}$ = 2 A~35 A |
| Range of 5 V load current | $I_{L2}$ = 0.3 A~15 A |

TABLE (2)

| Components in resonant tank | 12 V output ($V_{O1}$) | 5 V output ($V_{O2}$) |
|---|---|---|
| Turn ratio $N_P:N_S$ | 31:2 | 38.5:1 |
| Resonant inductor $L_r$ | 28.9 μH | 24 μH |
| magnetizing inductance $L_m$ | 1050 μH | 2190 μH |
| Resonant capacitor $C_r$ | 0.15 μF | 0.082 μF |
| Resonant frequency $f_r$ | 76 kHz | 113 kHz |
| Characteristic impedance $Z_0$ | 14 Ω | 17 Ω |

Figure 6:
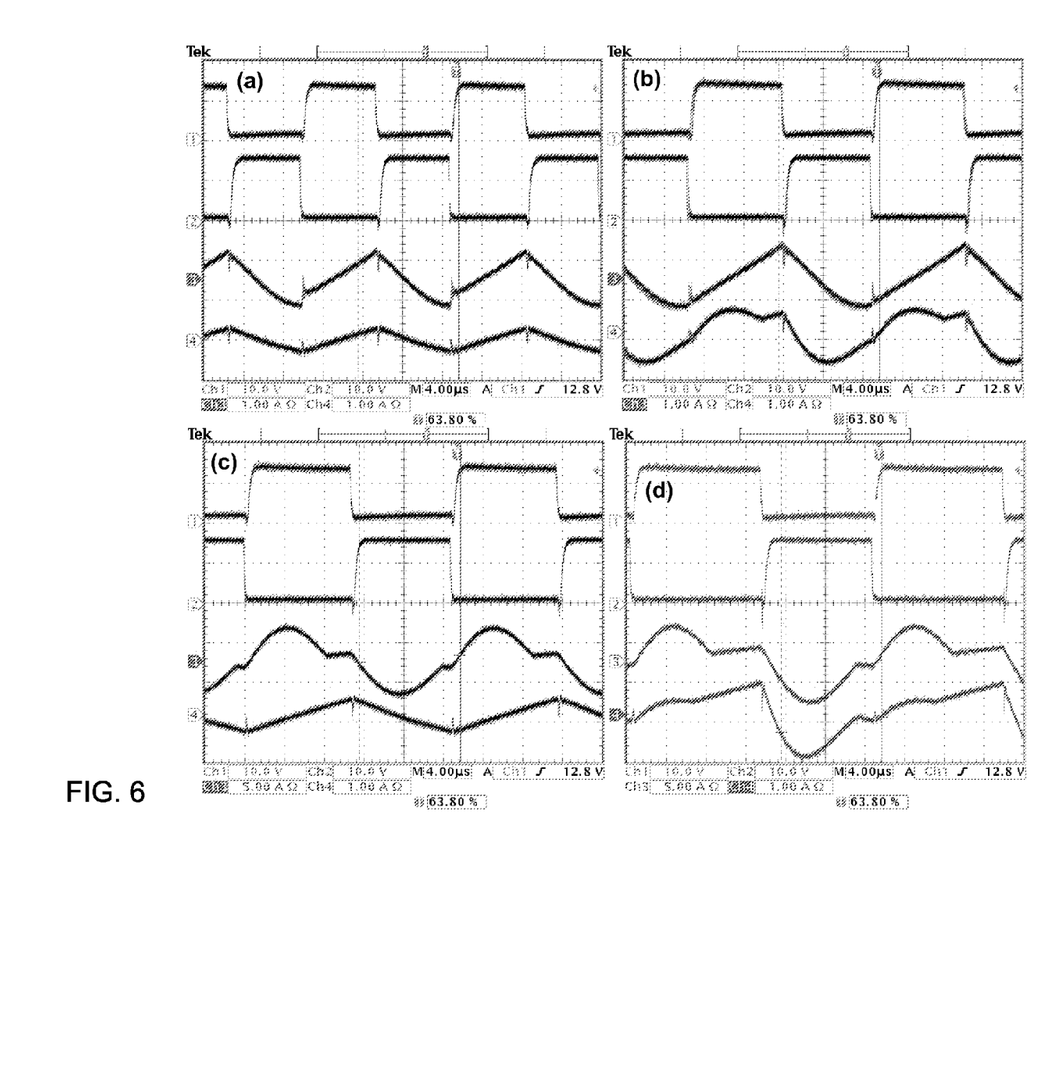
FIG. 6 is a measured waveform diagram of the double-output half-bridge LLC serial resonant converter with input voltage of 380V.

Please refer to FIG. 6, there is shown a measured waveform diagram of the double-output half-bridge LLC serial resonant converter with input voltage of 380V, in which, plot diagram (a) shows the waveforms of 12V/3 A output voltage/current and 5V/0.3 A output voltage/current; besides, plot diagram (b) shows the waveforms of 12V/2 A output voltage/current and 5V/15 A output voltage/current; moreover, plot diagram (c) shows the waveforms of 12V/35 A output voltage/current and 5V/0.3 A output voltage/current; furthermore, plot diagram (d) shows the waveforms of 12V/35 A output voltage/current and 5V/15 A output voltage/current.

Figure 7:
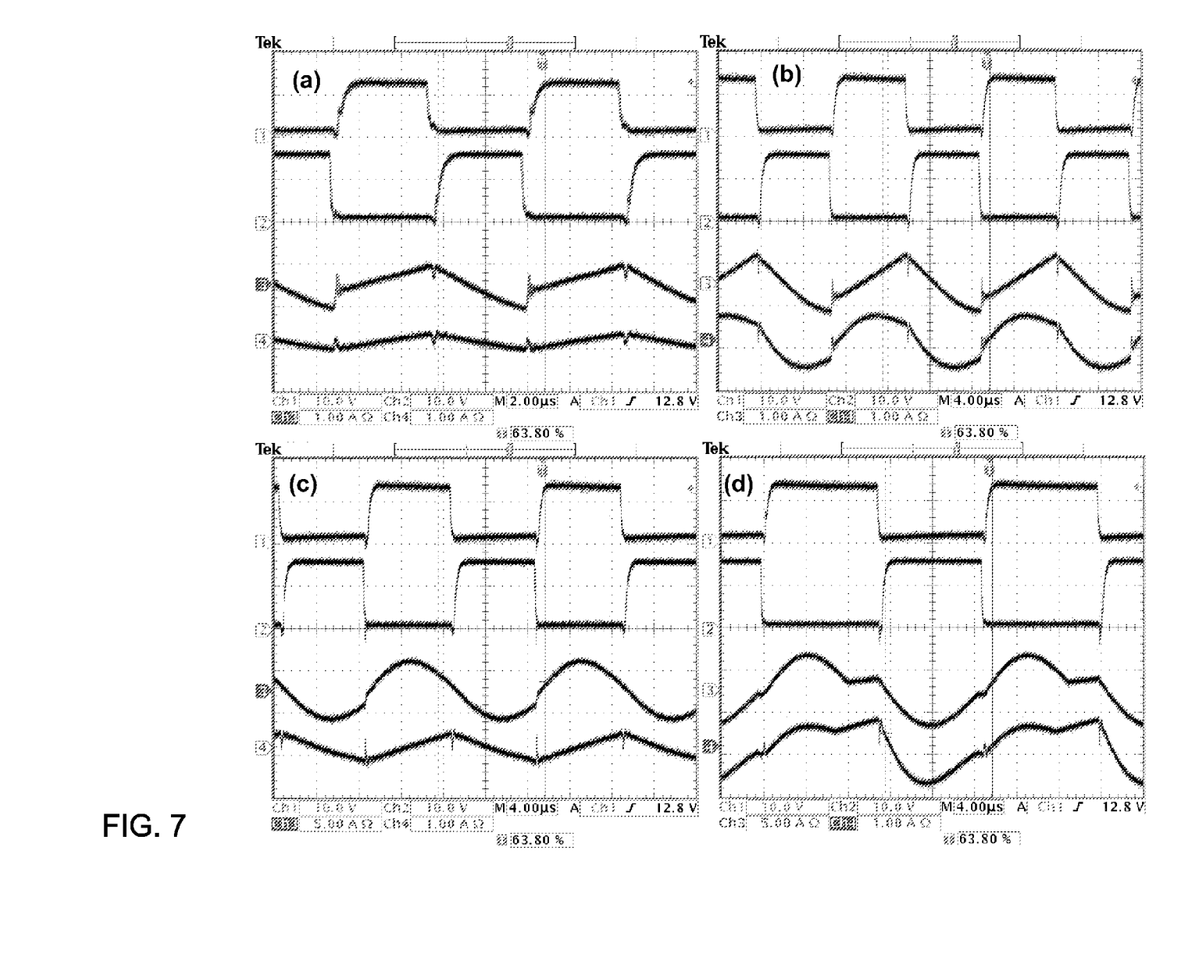
FIG. 7 is a measured waveform diagram of the double-output half-bridge LLC serial resonant converter with input voltage of 390V.

Continuously, please refer to FIG. 7, there is shown a measured waveform diagram of the double-output half-bridge LLC serial resonant converter with input voltage of 390V, in which, plot diagram (a) shows the waveforms of 12V/0.3 A output voltage/current and 5V/0.3 A output voltage/current; besides, plot diagram (b) shows the waveforms of 12V/2 A output voltage/current and 5V/15 A output voltage/current; moreover, plot diagram (c) shows the waveforms of 12V/35 A output voltage/current and 5V/0.3 A output voltage/current; furthermore, plot diagram (d) shows the waveforms of 12V/35 A output voltage/current and 5V/15 A output voltage/current.

Figure 8:
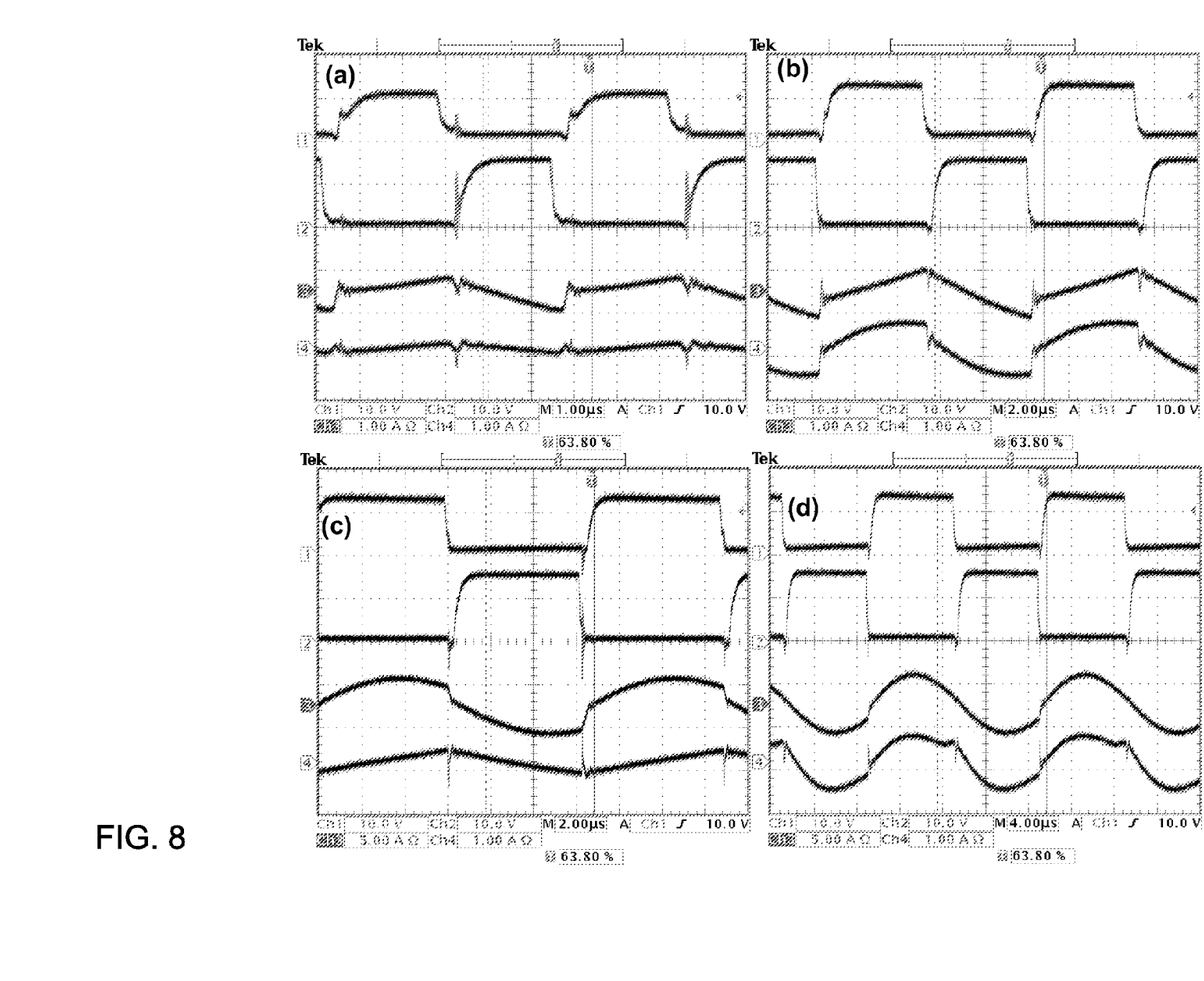
FIG. 8 is a measured waveform diagram of the double-output half-bridge LLC serial resonant converter with input voltage of 400V.

Finally, please refer to FIG. 8, there is shown a measured waveform diagram of the double-output half-bridge LLC serial resonant converter with input voltage of 400V, in which, plot diagram (a) shows the waveforms of 12V/0.3 A output voltage/current and 5V/0.3 A output voltage/current; besides, plot diagram (b) shows the waveforms of 12V/2 A output voltage/current and 5V/15 A output voltage/current; moreover, plot diagram (c) shows the waveforms of 12V/35 A output voltage/current and 5V/0.3 A output voltage/current; furthermore, plot diagram (d) shows the waveforms of 12V/35 A output voltage/current and 5V/15 A output voltage/current.

Thus, through the descriptions, the circuit framework, circuit components, technology features, and performances of the double-output half-bridge LLC serial resonant converter have been completely introduced and disclosed; in summary, the present invention has the following advantages:

1. The double-output half-bridge LLC serial resonant converter of the present invention has an inventive circuit framework, which can solve the unbalance load current and the output voltage cross regulation occurred in the conventional double-output convertor.

2. Moreover, in the double-output half-bridge LLC serial resonant converter, the no-load or light-load output voltage can also be normally modulated, therefore the output voltage deviation can be effectively controlled.

The above description is made on embodiments of the present invention. However, the embodiments are not intended to limit scope of the present invention, and all equivalent implementations or alterations within the spirit of the present invention still fall within the scope of the present invention.

What is claimed is:

1. A double-output half-bridge LLC serial resonant converter, comprising:
    a half-bridge rectifying unit, comprising a first MOSFET and a second MOSFET, and being coupled to an input voltage signal for processing a full cycle rectification to the input voltage signal;
    a first resonant unit, comprising a first resonant inductor and a first resonant capacitor, and being coupled to the half-bridge rectifying unit for receiving the full-cycle rectified input voltage signal;
    a first transformer unit, being coupled to the half-bridge rectifying unit, wherein the input voltage signal is transmitted to the secondary side coil from the primary side coil of the first transformer unit, so as to be transformed to a secondary side voltage signal;
    a first rectifying unit, being coupled to the first transformer unit for further rectifying the secondary side voltage signal;
    a first output unit, being coupled to the first rectifying unit and having a first load resistor, wherein the first resonant inductor, the first resonant capacitor and the first load resistor constitute a serial resonant circuit, and the serial resonant circuit making the secondary side voltage signal be losslessly transmitted to the first load resistor, so as to be outputted;
    a second resonant unit, comprising a second resonant inductor and a second resonant capacitor, and being coupled to the half-bridge rectifying unit for receiving the full-cycle rectified input voltage signal;
    a second transformer unit, being coupled to the half-bridge rectifying unit, wherein the input voltage signal is transmitted to the secondary side coil from the primary side coil of the second transformer unit, so as to be transformed to the secondary side voltage signal;
    a second rectifying unit, being coupled to the second transformer unit for further rectifying the secondary side voltage signal;
    a second output unit, being coupled to the second rectifying unit and having a second load resistor, wherein the second resonant inductor, the second resonant capacitor and the second load resistor constitute a serial resonant circuit, and the serial resonant circuit making the secondary side voltage signal be losslessly transmitted to the second load resistor, so as to be outputted;
    a voltage dividing unit, being coupled to the first output unit and the second output unit, used for processing a voltage division to a first output voltage of the first output unit and a second output voltage of the second output unit;
    a voltage regulating unit, comprising at least one operational amplifier and being coupled to the voltage dividing unit for regulating and modulating the first output voltage and the second output voltage;
    a light-coupling isolation unit, being coupled to the voltage regulating unit; and
    a control unit, being coupled to the light-coupling isolation unit, wherein the control unit is used for controlling the switch of the first MOSFET and the second MOSFET, moreover, the light-coupling isolation unit isolating the control unit from the first output voltage and the second output voltage.

2. The double-output half-bridge LLC serial resonant converter of claim 1, wherein the first MOSFET and the second MOSFET respectively have a first body diode and a second body diode in the interior thereof.

3. The double-output half-bridge LLC serial resonant converter of claim 2, wherein the first MOSFET and the second MOSFET respectively have a first parasitic capacitor and a second parasitic capacitor in the interior thereof.

4. The double-output half-bridge LLC serial resonant converter of claim 1, wherein the first rectifying unit consists of a first rectifying diode and a second rectifying diode, in which the first rectifying diode is parallel connected to the second rectifying diode.

5. The double-output half-bridge LLC serial resonant converter of claim 1, wherein the second rectifying unit consists of a third rectifying diode and a fourth rectifying diode, in which the third rectifying diode is parallel connected to the fourth rectifying diode.

6. The double-output half-bridge LLC serial resonant converter of claim 1, wherein the first output unit further comprises a first output capacitor, being parallel connected to first the load resistor and used for filtering the non-DC signal on the secondary side voltage signal.

7. The double-output half-bridge LLC serial resonant converter of claim 1, wherein the second output unit further comprises a second output capacitor, being parallel connected to second the load resistor and used for filtering the non-DC signal on the secondary side voltage signal.

8. The double-output half-bridge LLC serial resonant converter of claim 1, wherein the voltage dividing unit consists of a first voltage dividing resistor, a second voltage dividing resistor and a third voltage dividing resistor.

9. The double-output half-bridge LLC serial resonant converter of claim 1, wherein the voltage regulating unit further comprises a first resistor, a second resistor and a first capacitor, which are coupled to the operational amplifier for providing a low-frequency gain, a mid-frequency gain, and a high-frequency gain to the operational amplifier.

10. The double-output half-bridge LLC serial resonant converter of claim 9, wherein the second resistor is series connected to the first capacitor, and the second resistor is parallel connected to the first resistor.

11. The double-output half-bridge LLC serial resonant converter of claim 9, wherein the light-coupling isolation unit consists of a light coupler, a third resistor and a fourth resistor.

12. The double-output half-bridge LLC serial resonant converter of claim 1, wherein the control unit is a high-voltage resonant controller.

13. The double-output half-bridge LLC serial resonant converter of claim 1, further comprising an input capacitor coupled to the input voltage signal and the half-bridge rectifying unit.

* * * * *